INVENTOR.
ARTHUR E. VOGEL
BY PALMER FULTZ
Schmieding & Fultz
ATTORNEYS

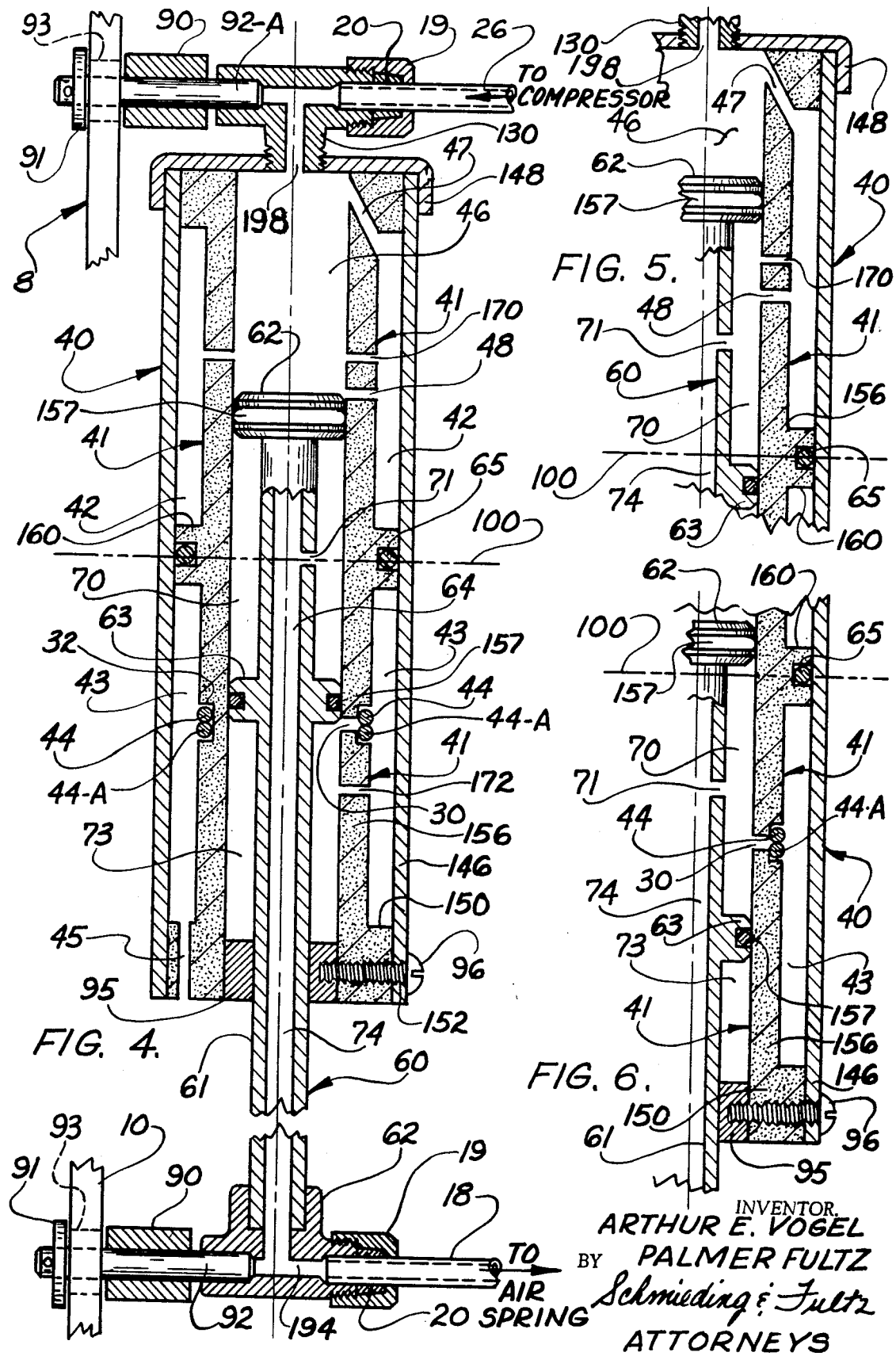

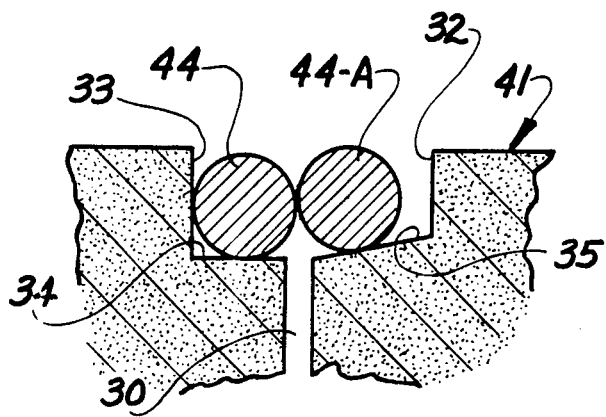
FIG. 7.
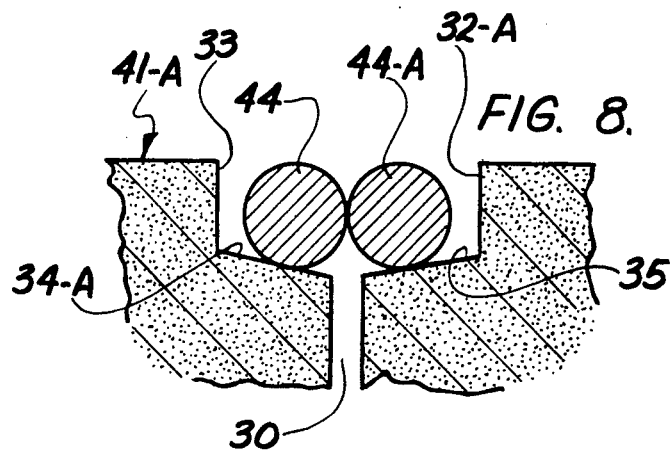
FIG. 8.
FIG. 10.
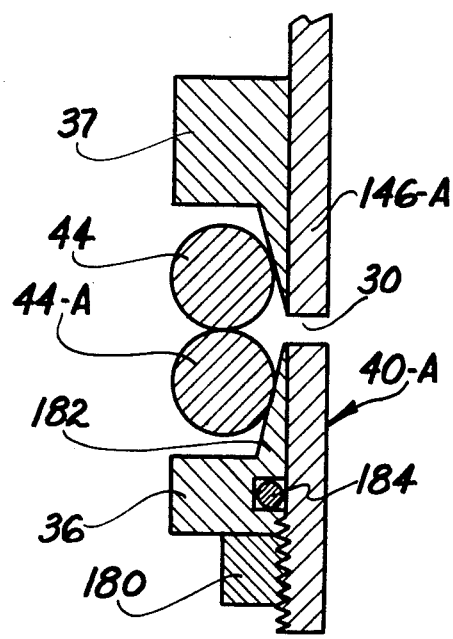
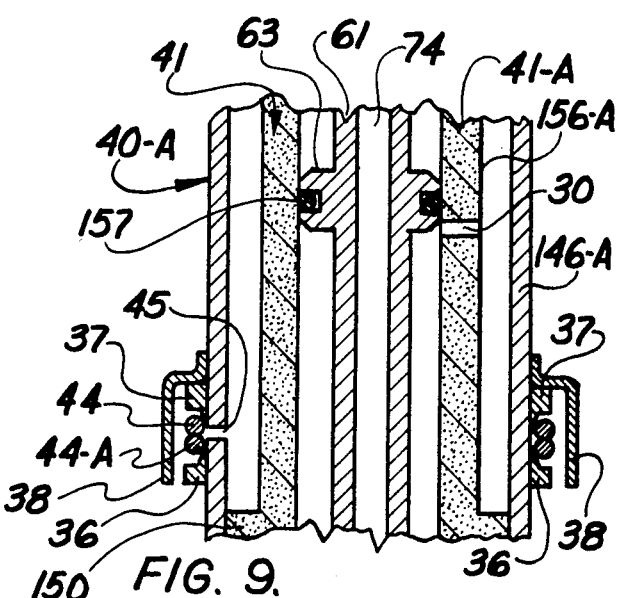
FIG. 9.
INVENTOR.
ARTHUR E. VOGEL
BY PALMER FULTZ
Schmieding & Fultz
ATTORNEYS

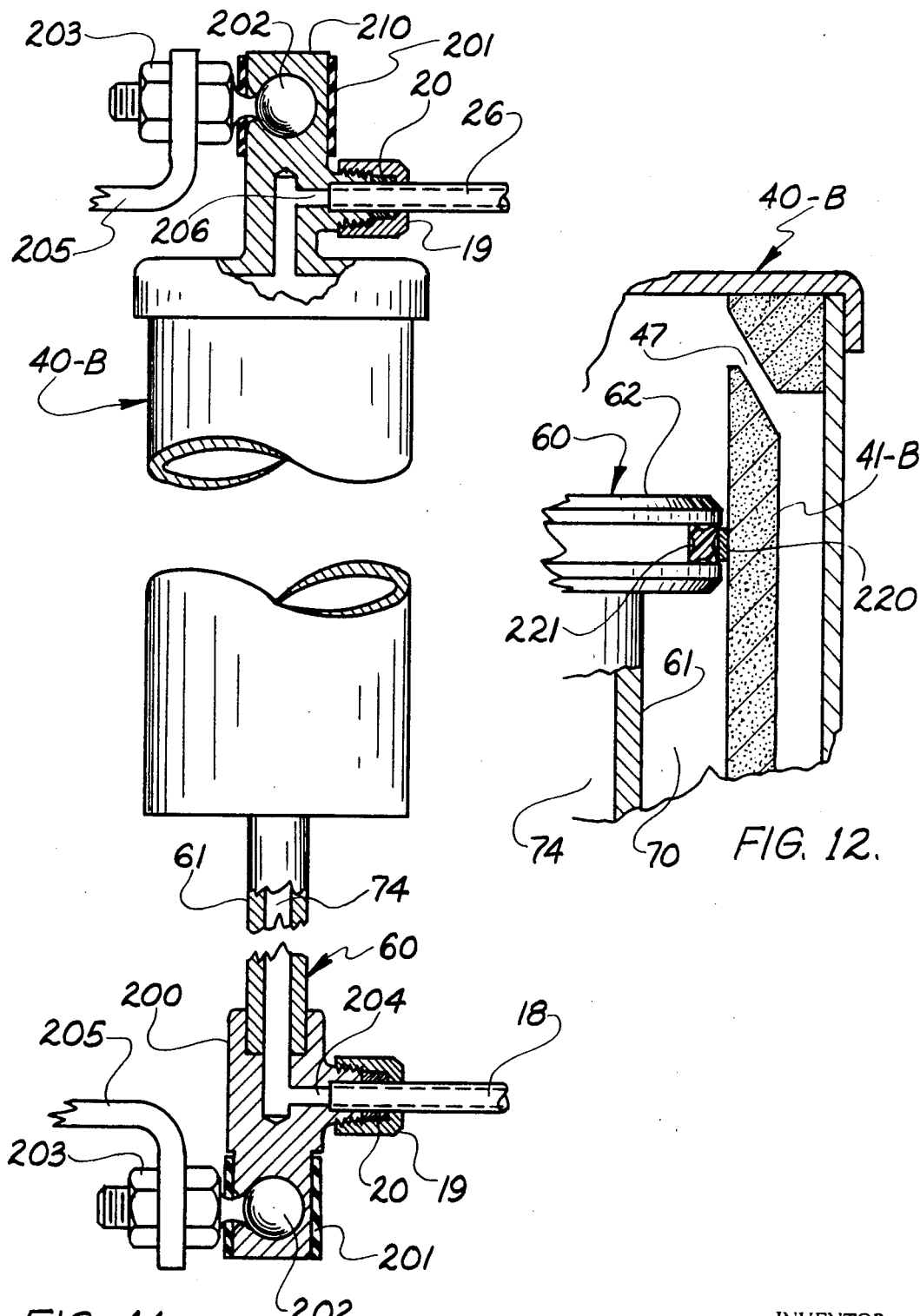

United States Patent Office 3,560,017
Patented Feb. 2, 1971

3,560,017
CONTROL APPARATUS FOR VEHICLE
SUSPENSIONS
Arthur E. Vogel and Palmer Fultz, Columbus, Ohio, assignors of twenty-five percent each to Robert T. Dawson, Coshocton, Ohio, and Warren H. F. Schmieding, Mount Helix, La Mesa, Calif.
Continuation of application Ser. No. 579,644, Sept. 15, 1966. This application Nov. 5, 1969, Ser. No. 871,565
Int. Cl. B60g 15/08
U.S. Cl. 280—124
35 Claims

ABSTRACT OF THE DISCLOSURE

A control system for vehicle suspensions of the type that include sprung and unsprung weight portions, air chambers operative between the weight portions and an air compressor for delivering pressurized air to said chambers. The system is further characterized by the compressor being stallable at predetermined pressures selected for the air chambers by a height control valve means mounted on one of said weight portions. The present application further relates to a novel height control valve for use in controlled suspension systems such as the one described above.

---

This application is a continuation of Ser. No. 579,644, filed Sept. 15, 1966, and now abandoned.

This invention relates to control systems for vehicle suspensions of the type that include air spring chambers for supporting at least a portion of the sprung weight of the vehicle.

In general, the present invention relates to novel method and apparatus wherein an air compressor is used to supply pressurized air for controlling the height of a vehicle suspension. The air compressor is of a type which is driven by a resilient force such as a flow of atmospheric air to the intake manifold of the engine that powers the vehicle and, in accordance with the present invention, a predetermined maximum static pressure is automatically established in the air chamber means of the suspension system by stalling the air compressor, against the pressure of said flow of atmospheric air that drives it, by an increase in back pressure at the compressor outlet.

The air compressor is also automatically released from its stalled state responsive to the pressure in the air chamber means when such pressure is less than the stalling pressure of the compressor. This causes a decrease in back pressure at the compressor outlet whereby the air compressor is automatically restarted to supply a pressure increase in the air spring chambers as is required to effect height control of the vehicle under increased static loading.

As another aspect of the present invention, the above mentioned maximum static pressure in the air chamber means is the designed pressure at which the air chamber means can continuously be safely operated without structural failure with the result that the air chamber means are always protected against any continued over-pressurization by directly controlling an air compressor means that pressurizes the system by incorporating in the compressor a predetermined area relationship between the driving piston and the driven piston. As a result, the pressure of the outlet flow of air from the compressor can never during cruise and idle operating conditions be greater than said maximum static pressure value.

More specifically, it has been determined that such predetermined maximum static pressure in the air chamber means will never be exceeded during cruise and idle operating conditions if the area relationship between the driving and driven piston means of the air compressor is established in accordance with an equation which will be referred to herein as the "Direct Regulation Equation" as follows:

$$P_{MAX} = \frac{A_1}{A_2} (P_{AA} - P_{MA})$$

where:

$P_{MAX}$ = The predetermined maximum static pressure in the air chamber means
$A_1$ = Area of the driving piston means of the compressor
$A_2$ = Area of the driven piston means of the compressor
$P_{AA}$ = Average atmospheric pressure
$P_{MA}$ = Average pressure in the engine manifold at normal cruising and idling speeds As another aspect of the present invention, the above described air compressor is also stalled at various air spring chamber pressures, below said predetermined maximum, by height control valve means for the flow of pressurized air from the compressor to the air spring chambers. Such valve means is operated responsive to a predetermined normal configuration height differential between the sprung and unsprung weights of the vehicle. This arrangement effects automatic direct "on-off" control of the compressor running cycle as is required to maintain said predetermined normal height differential between the sprung and unsprung weights of the vehicle.

As another function of said height control valve means it is adapted to operate during actual operation of the vehicle responsive to road imposed oscillations and effect controlled direct "on-off" cycling of the compressor as well as the controlled admission and exhaust of air from the air chamber means under actual dynamic operating conditions.

Such controlled dynamic operation of the present system is effected in accordance with the present invention by a novel time delay exhaust restrictor means that is "tuned" with respect to the above mentioned dynamic operation of the height control valve means such that the exhaust flow rate from the time delay exhaust restrictor means is proportional with respect to the inlet flow rate through the height control valve means. Such controlled exhaust rate is established by the size of said time delay exhaust restrictor means which must be small enough that road imposed oscillations of the height control valve means for minute time intervals can never exhaust air from the system at a flow rate greater than the flow rate admitted by reciprocating action of the height control valve means.

This prevents an undesirable "pumping down" of the air chamber means under sustained road imposed oscillations and eliminates the need for a manual shut-off valve for the exhaust flow from the height control valve means.

At the same time the size of the time delay exhaust restrictor means must be large enough to provide a sufficient exhaust flow rate to prevent undesirable "pumping up" of the air chamber means during oscillatory conditions. It therefore follows that the size of the restrictor means is tuned to establish an exhaust flow rate substantially equal to the flow rate admitted to the height control valve means during dynamic conditions.

As another aspect of the present invention the novel time delay restrictor means and its tuned operation with respect to the height control valve means completely eliminate the need for a manual shut-off valve for the exhaust flow from the system of the type utilized in United States Letters Patent 3,173,671 to Broadwell dated Mar. 16, 1965.

As another aspect of the present invention the control system includes a novel O-ring minimum pressure valve that functions to prevent the pressure in the chamber means from ever falling below a predetermined minimum pressure value. This prevents collapsing of the air chamber means and chafing and wear of the chamber walls which would occur if said minimum pressure were not maintained.

As another aspect of the present invention the suspension control system in one of its embodiments comprises a novel height control strut valve that has a first pivotal mounting connection with one of the sprung and unsprung weights and a second pivotal mounting connection with the center of a transverse torsion bar which is in turn connected at each of its right and left ends to respective sides of the other of said sprung and unsprung weights. This torsion bar mounting arrangement permits the single height control strut valve to effect control in a manner that is insensitive to the direction of turn when the vehicle is cornering.

As another aspect of the present invention the suspension control system incorporates a novel height control strut valve that includes upper and lower pivotal mountings uniquely adapted to function as passages which lead from the interior of the strut valve to both the air chamber means and the source of pressurized fluid.

As another aspect of the present invention the suspension control system incorporates a novel height control strut valve that comprises a position command orifice means which includes main small orifice porting adapted to realse only small volumetric flows of air during normal, small road imposed oscillations of the vehicle suspension, but which position command orifice means includes larger auxiliary orifice porting for rapidly effecting relatively large height corrections of the suspension upon the occurrence of variations in the static loading of the vehicle. This arrangement reduces the amount of pressurized air required to operate the system.

As another aspect of the present invention the suspension control system incorporates a novel height control strut valve that includes an outer tubular housing formed of high-strength material such as stainless steel and a cylinder liner formed of self-lubricating material such as carbonaceous material, Delrin, or the like, to provide a multiple function, self-lubricating and corrosion-proof mechanism. This composite strut valve construction results in almost infinite life for a mechanism that must necessarily undergo millions of cycles in the course of reciprocating with the vehicle suspension system.

As another aspect of the present invention the suspension control system incorporates a novel height control strut valve that is pivotally mounted between upper and lower connections with the sprung and unsprung weights, and which is internally pressure biased outwardly towards both pivotal connections thereby preventing road imposed vibrational rattles at said valve and connections.

It is therefore an object of the present invention to provide a novel air compressor type method and apparatus for controlling a vehicle suspension system wherein a maximum predetermined static pressure in the air chamber means of the system is established in a novel manner so as to be equal to a designed maximum operating pressure for the system. This is accomplished by incorporating in the air compressor a predetermined area relationship between the driving piston and the driven piston such that the air compressor is stalled against the pressure of the flow of atmospheric air that drives it when the pressure in said air chamber means reaches said designed maximum operating pressure.

It is another object of the present invention to provide a controlled vehicle suspension system which during dynamic operation of the vehicle automatically controls the inlet and exhaust flow rates to and from the system and thereby prevents any undesirable "pumping down" or "pumping up" of the air chamber means under sustained road imposed oscillations.

It is another object of the present invention to provide a controlled vehicle suspension system which comprises an O-ring minimum pressure valve that functions with high accuracy to prevent the pressure in the air chamber means from ever falling below a predetermined minimum pressure value. This prevents collapsing of the air chamber means and resulting chafing and wear of the chamber walls.

Another object of the present invention is to provide a control system for vehicle suspensions that comprises a novel combination of resiliently driven air compressor, associated height control valve and time delay exhaust restrictor means that cooperate to eliminate the need for a high pressure air reservoir as well as pressure regulating mechanism for controlling the pressure therein.

Another object of the present invention is to provide a novel control system for vehicle suspensions that incorporates mechanism of extreme simplicity that is highly economical to manufacture and maintain.

It is another object of the present invention to provide a novel height control strut valve that effects the triple function of flow control valving of the flow of air to and from the air chamber means, suspension position sensing, and direct pressure responsive "on-off" control of the running cycle of the air compressor.

Another object of the present invention is to provide a novel height control strut valve that includes a time delay exhaust restrictor means that is "tuned" so that during dynamic operation of the vehicle the inlet and exhaust flow rates to and from the system are controlled to prevent any undesirable "pumping up" or "pumping down" of the air chamber means during sustained road imposed oscillations.

Another object of the present invention is to provide a height control strut valve that includes an O-ring minimum pressure valve that functions with high accuracy to prevent the pressure in the air chamber means from ever falling below a predetermined minimum pressure value. This prevents collapsing of the air chamber means and resulting chafing and wear of the chamber walls.

Another object of the present invention is to provide a control system for vehicle suspensions that incorporates a novel height control strut valve of extreme simplicity and economy.

Another object of the present invention is to provide a novel height control strut valve that is self-lubricating, and corrosion resistant so as to provide almost infinite life for a mechanism that must necessarily undergo millions of cycles in the course of reciprocating with the vehicle suspension system.

Another object of the present invention is to provide a novel height control strut valve that is internally pressure biased towards its pivotal mounting connections thereby preventing wear imposed rattling of the valve components and connections.

Another object of the present invention is to provide a control system for vehicle suspensions that comprises a novel height control strut valve which incorporates a "dead band" zone in which the strut valve is inoperative during slight reciprocations of the vehicle suspension system.

Another object of the present invention is to provide a control system for vehicle suspensions that incorporates a novel height control strut valve comprising upper and lower pivotal mountings uniquely adapted to function as flow passages which lead from the interior of the strut valve to both the air chamber means and the source of pressurized fluid.

Another object of the present invention is to provide a control system for vehicle suspensions that comprises a novel height control strut valve that is economical in its use of pressurized fluid in that it releases only small volheight control strut valve of FIG. 4 showing a modified umetric flows of air during normal, small road imposed oscillations of the vehicle suspension. The strut valve is, however, adapted to release larger volumetric flows of air when it is desirable to rapidly effect relatively large height corrections of the suspension upon occurrence of variations in the static loading of the vehicle.

Further objects and advantages of the present invention will be apparent from the following description, reference being had to the accompanying drawings wherein preferred forms of embodiments of the invention are clearly shown.

In the drawings:

FIG. 4 is a side sectional view of a height control strut valve comprising a portion of the control systems of FIGS. 1 and 2, the section being taken along a vertical plane through the centerline of said valve;

FIG. 5 is a partial side sectional view showing the height control strut valve of FIG. 4 in a "down" position;

FIG. 6 is a second partial side sectional view showing the height-control strut valve of FIG. 4 in an "up" position;

FIG. 7 is a partial end sectional view of the height control strut valve of FIG. 4 showing a novel pressure relief valve constructed in accordance with the present invention;

FIG. 8 is another partial end sectional view of the height-control strut valve of FIG. 4 showing a modified pressure relief valve construction in accordance with the present invention;

FIG. 9 is a partial side elevational view showing a modified height control strut valve constructed in accordance with the present invention and provided with a modified adjustable pressure relief valve construction;

FIG. 10 is an enlarged side elevational view of the adjustable pressure relief valve means of FIG. 9;

FIG. 11 is a side elevational view, partially in section, of a modified height control strut valve constructed in accordance with the present invention, the section being taken along a vertical plane through the centerline of said valve; and FIG. 12 is a side sectional view showing a modified piston seal incorporated in the modified height control strut valve of FIG. 11.

Figure 1:
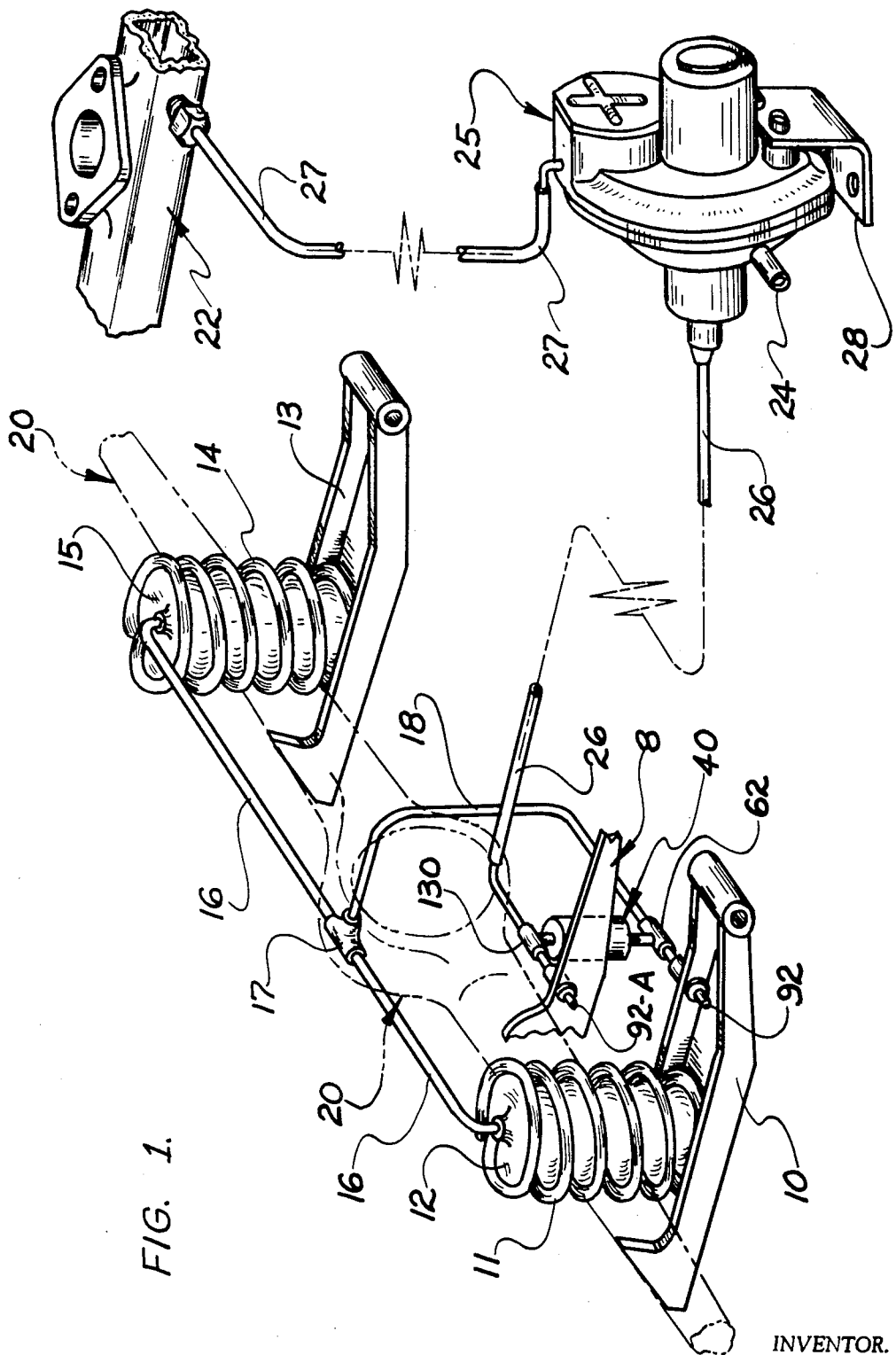
FIG. 1 is a perspective view of a control system for vehicle suspensions constructed in accordance with the present invention.

Referring in detail to the drawings, FIG. 1 illustrates a control system for a vehicle suspension constructed in accordance with the present invention which includes a sprung weight portion indicated generally at 8, and unsprung weight portions 10 and 13.

The sprung weight 8 includes a conventional vehicle frame, only partially illustrated here for clarity, that is supported by coil springs 11 and 14 mounted on the rear of the vehicle, it being understood that the front of the vehicle is also supported on similar springs in the conventional manner.

The sprung weight 8 is also supported by a plurality of air chamber means consisting of air spring chambers 12 and 15 which are preferably formed by flexible bags formed of synthetic rubber or the like and positioned to function in parallel with the coil springs 11 and 14.

Figure 2:
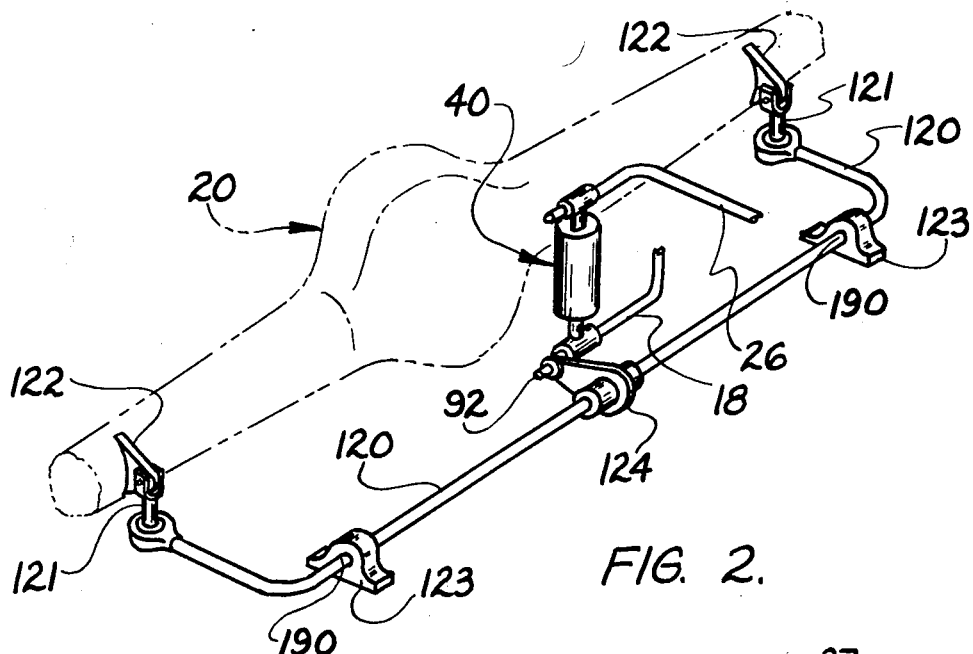
FIG. 2 is a perspective view of a modified control system similar to the system of FIG. 1.

The unsprung weight further includes a conventional rear axle and universal assembly shown in phantom and indicated generally at 20 in FIGS. 1 and 2.

With continued reference to FIG. 1 a height control strut valve is indicated generally at 40 and includes a lower pivotal connection with one of the unsprung weight portions 10 at a pivot pin 92. The top of strut valve 40 is also pivotally connected to the sprung weight portion 8 at a second pivotal connection formed by a second pivot pin 92–A.

As a preferred upper mounting location for strut valve 40 the lower pivot pin 92-A, FIG. 1, or the lower ball pivot 202, FIG. 11, is attached to the conventional rear "track bar" of the vehicle, not illustrated, at a point along the track bar where the desired valve travel will be achieved. In general such track bar is a horizontally disposed bar having one end pivotally attached to one side of the vehicle frame and the other end pivotally attached to the differential housing adjacent the center thereof and functions to keep the sprung weight of the vehicle centered with respect to the unsprung weight. Hence, it will be understood that the track bar is connected diagonally between the sprung and unsprung weights and travels in an arc with suspension oscillations such that various locations along the track bar have different vertical amplitudes of movement with respect to the sprung weight portion 8. Hence strut valve 40 can be selectively located on the track bar so as to achieve the proper designed vertical piston movement.

In a typical installation on a 1966 Ford automobile, in order to provide an inch and one half maximum stroke for strut valve 40 its lower pivot 92–A or 202 is attached approximately seven inches from the frame attached end of the above described rear track bar.

Height control strut valve 40 receives pressurized air from an air compressor indicated generally at 25 via a line 26 which communicates with combined mount and intake fitting 130 on the top of the strut valve.

The interior of each of the air spring chambers 12 and 15 communicates with strut valve 40 via a second combined mount and intake fitting 62, line 18, T-connection 17, and line 16.

Figure 3:
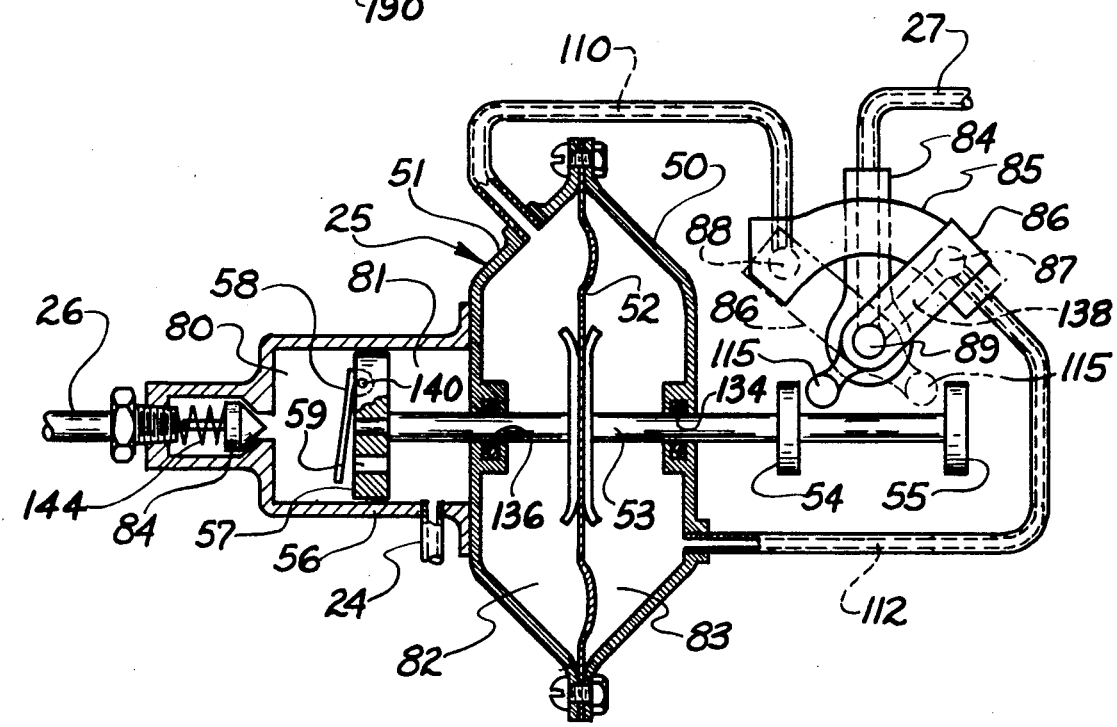
FIG. 3 is a side sectional view of an air compressor comprising a portion of the control systems of FIG. 1 and FIG. 2, the section being taken along a vertical plane through the longitudinal centerline of the compressor.

Referring next to FIG. 3, compressor 25 includes a smaller cylinder 56 provided with a driven piston 57 that is reciprocated by a larger driving piston or flexible diaphragm 52, said pistons being rigidly connected by a rod 53 slideably mounted in the sealed bores 134 and 136 formed in the walls of compressor housing portions 50 and 51.

It should be pointed out that the larger driving piston 52, together with the pressure exerted by atmospheric air on said diaphragm, constitute a resilient driving means or force which permits repeated stalling and restarting of the compressor, without damage by the back pressure of the pressurized flow of air from the compressor outlet.

Driving piston 52 is reciprocated by alternate pressurization of two separate air chambers 82 and 83 which are respectively connected to ports 88 and 87 of a compressor timing valve via the lines 110 and 112. For purposes of clarity of illustration said timing valve mechanism is diagrammatically illustrated in FIG. 3 and includes a center port 89 which is always in communication via line 27 with a source of vacuum preferably provided by the intake manifold of the vehicle engine, said manifold being indicated generally at 22.

The compressor timing valve mechanism further includes a pivotally mounted arm 86 that is provided with a longitudinal passage 138 and such arm is reciprocated, between the position shown in solid delineation and the position shown in dotted delineation by two valve actuating shoulders 54 and 55 which are rigidly mounted on the rear end of piston driving rod 53.

It will now be understood that when valve arm 86 is in the position shown by solid delineation passage 138 in the arm connects one chamber 83 of compressor 25 with intake manifold 22 via line 112, port 87, passage 138, port 89, and line 27. Similarly when arm 86 is in the position shown by dotted delineation then passage 136 connects the other chamber 82 with intake manifold 22 via a line 110, port 88, arm 86, port 89, and line 27.

It should also be pointed out that when valve arm 86 is at port 87 the other port 88 is open to atmospheric air and vice versa.

It will now be understood that when chambers 82 and 83 are alternately evacuated, atmospheric air enters a respective one of the valve ports 88 or 87 and drives diaphragm 52 towards the evacuated one of the chambers. As the diaphragm 52 moves it will carry along piston driving rod 23 and flip timing valve arm 86 whereby the other one of the chambers 82 or 83 is evacuated to drive diaphragm 52 in the opposite direction.

With continued reference to FIG. 3, and particularly to the smaller driven piston 57, it will be understood that when the piston is moved to the right by diaphragm 52 and drive rod 53, cylinder 80 is charged via intake line 24, chamber 81, passage 59, and flapper valve 58, said valve being on piston 140 so as to be openable by the pressure of the entering air.

When piston 57 is driven to the left, FIG. 3, flapper valve 58 is closed by air pressure whereby the piston pressurizes cylinder 80 and forces open valve 84 normally biased against its seat by a valve spring 144.

Reference is next made to FIGS. 4, 5, and 6, for the purpose of describing in detail the novel height control strut valve 40 which includes a tubular outer housing 146 preferably made of stainless steel tubing or other non-corrosive material.

The upper end of outer housing 146 is provided with a sealed cover 148 on which is mounted the previously mentioned mount and passage fitting 130.

Height control strut valve 40 further includes a cylinder means indicated generally at 41 which is preferably formed of self-lubricating material such as Delrin, carbonaceous material, or the like. The lower end of cylinder means 41 includes an integrally formed boss 150 and a lower cylinder chamber 73 is closed by a piston rod bearing plug 95, said cylinder means and bearing plug being secured in outer housing 146 by a screw 96 which extends through outer housing 146, boss 150 and into rod bearing plug 95.

With continued reference to FIG. 4, strut valve 40 includes a piston means indicated generally at 60 which includes spaced piston portions 62 and 63 and a rod 61 that reciprocates in a bore in piston rod bearing plug 95. Piston rod 61 is further provided with a longitudinally extended passage 74 which communicates with a chamber 70 via hole 71 through the wall of the rod and the lower end of the rod is secured in a hole in fitting 62 by silver solder or the like.

Each of the piston portions 62 and 63 includes a resilient seal 157 in sealed sliding engagement with the inner surface of wall 156 of cylinder member 41.

As is best seen in FIG. 4, cylinder means 41 includes a central annular flange 160 in which is mounted an annular resilient seal 65 so as to form an upper sealed annular chamber 42 and a lower sealed annular chamber 43, the upper one of said annular chambers 42 being in communication with a central cylinder chamber 46 via a passage 47.

With continued reference to FIGS. 4 through 6, height control strut valve 40 is provided with a position command orifice means that cooperates with piston means 60 for sensing departure of the suspension and strut valve from the normal configuration of FIG. 4 as indicated by the normal configuration datum line 100. Such position command orifice means includes main exhaust orifice 30 for commanding position during exhaust and main intake orifice 48 for commanding position during intake.

In the embodiment shown in FIGS. 4–6 pressurized air is released from inner chamber 70 via main exhaust position command orifice 30, O-ring minimum pressure valve 44—44–A, lower annular chamber 43 and a vertical passage 45 formed through boss 150 of cylinder means 41.

One important function of height control strut valve 40 is provided by "tuning" exhaust orifice 30 with respect to intake orifice 48 such that orifice 30 functions as a time delay exhaust restrictor means. As a result, during dynamic operation of the vehicle the exhaust flow rate through exhaust orifice 30 is controlled to be not substantially greater than the flow rate admitted through intake orifice 48. Such controlled exhaust rate is established by the size of said exhaust orifice 30 such that road imposed oscillations of the height control valve means for minute time intervals will never exhaust air from the air chamber means at a flow rate greater than the flow admitted by reciprocation of piston means 60. This prevents an undesirable "pumping down" of the air chamber means under sustained road imposed oscillations.

At the same time the size of exhaust orifice means 30 must be large enough with respect to intake orifice 48 to provide a sufficient exhaust flow rate to prevent undesirable "pumping up" of the air chamber means during oscillatory conditions. It therefore follows that the size of exhaust orifice 30 is tuned to establish an exhaust flow rate substantially equal to the admitted flow rate from the compressor 25 through intake orifice 48 during oscillatory conditions.

Under decreases in static loading of the vehicle for sustained time intervals, the controlled exhaust flow capacity is great enough to promptly make the required height control correction required for the decreased load condition.

In the typical system disclosed herein it has been calculated and determined that a typical area for exhaust orifice 30 can be provided by three circumferentially spaced holes each of which has a diameter of twenty-five thousandths (.025) of an inch. It will be understood that a single larger hole having an area equal to the sum of the areas of three twenty-five thousandths of an inch holes could be substituted. Such exhaust orifice area has been found to be proper in a system where the driving and driven piston means of the compressor are proportioned in area as discussed in detail later herein. Also these areas are designed for an average intake manifold pressure of twenty inches of mercury during normal cruise and idle conditions.

It should be pointed out that tuned control can be achieved in an alternate way other than establishing the size of exhaust orifice 30 to provide the required exhaust flow rate without departing from the spirit of the present invention. Instead the size of passage means 45, FIG. 4, can be established to provide an exhaust flow rate in proportion to the flow rate through intake orifice 48. In such alternate arrangement the size of exhaust orifice 30 must of course be larger than the tuned size of passage 45 such that passage 45 becomes the controlling exhaust restrictor.

As a second important function, exhaust orifice 30 (the time delay exhaust restrictor means), in combination with O-ring valve elements 44 and 44–A, is uniquely adapted to accurately maintain extremely low minimum air pressure values and is very important in preventing the pressure in air chamber means 12 and 15 from ever falling below a predetermined minimum low pressure value, for example 2 p.s.i. This prevents collapsing of the air chamber means and thereby eliminates frictional wear and chaffing of the chamber walls.

Such maintenance of a low minimum pressure is accomplished in a novel manner by disposing the two O-ring valve elements 44 and 44–A in contiguous relationship and in slightly stretched configuration in an annular groove 32.

The bottom surface of annular groove 32 is preferably inclined upwardly and outwardly in both directions from the center whereby the O-ring valve elements are constantly biased towards said contiguous relationship.

It will now be understood that when the vehicle is unloaded and the pressure in air chamber means 12 and 15 drops, then O-ring valve elements 44 and 44–A will separate and thereby exhaust air only until the system pressure drops to said predetermined minimum established by the dimensions and configuration of annular groove 32 and O-ring valve elements 44 and 44–A.

FIG. 7 is a cross sectional view showing O-ring groove 32 in enlarged relationship where it will be noted that a portion 35 of the lower wall of the groove, on one side of orifice 30, is slightly inclined so as to cause O-ring 44-A to move against O-ring 44 to provide the bias between the O-rings.

FIG. 8 shows a modification wherein both portions 34-A and 35 of the bottom groove wall are inclined so as to provide the bias between the O-rings.

FIG. 9 shows a modified O-ring minimum pressure valve mechanism wherein the O-ring groove is removed from the cylinder means as is indicated by the modified cylinder wall 156-A and, instead, the pressure relief mechanism is formed by one or more holes 45 formed through a modified outer housing 40-A. In this modification the bias between the O-rings can be adjusted, as seen in the enlarged view of FIG. 10, by rotating a threaded lock ring 180 thereby moving a tapered annular O-ring supporting surface 182 formed on annular ring 36, said inner surface of said lock ring being in sealed relationship with outer wall 146-A at an annular resilient seal 184.

In operation of height control strut valve 40, reference should be made to FIGS. 4-6. Assuming that the vehicle is at rest with piston means 60 at the normal configuration datum line 100, when the static loading of the vehicle is increased housing means 40 will move downwardly with respect to piston means 60 from the "normal position" of FIG. 4 to the "down position" of FIG. 5, thereby opening upper position command orifices 48, or both the upper position command orifices 48 and 170, depending on the magnitude of the increase in static loading. When this occurs the piston means 60 connects driven cylinder 80 of the compressor with air spring chambers 12 and 15 via compressor valve 84, line 26, passage 198 in fitting 130, chamber 46, passage 47, upper annular chamber 42 upper position command orifices 48 and 170, hole 71, rod passage 64, the passage 194 in fitting 62, line 18 and line 16 connected to the interior of the air spring chambers 12 and 15. Such delivery of air is made from the compressor to air spring chamber 12 and 15 until the air spring chambers inflate sufficiently to raise the sprung weight and housing means of the strut valve to the normal configuration datum position shown in FIG. 4 wherein piston portion 62 falls below main upper position command orifice 48 and thereby isolates annular chamber 70. This terminates the delivery of air to the air chambers 12 and 15 and stalls the compressor due to back pressure on smaller compressor cylinder 80.

It will be understood that compressor 25 is stalled since the atmospheric pressure exerted on compressor-diaphragm 52 is not sufficient to drive the compressor piston means 52-57 when the position command orifices are closed.

The operation of height control strut valve 40, when static loading of the vehicle is decreased, will next be considered. When the load decreases outer housing 40 and cylinder means 41 of height control valve will move from the "normal position" of FIG. 4 to the "up position" of FIG. 6 which exhaust air from the air spring chambers 12 and 15 to atmosphere via line 16, line 18, passage 194 in lower fitting 62, rod passage 64, hole 71, central annular passage 70, position command orifice 30, O-ring pressure relief valve 44-44A, lower annular chamber 43, and passage 45 to atmosphere.

The pressurized air will then be released from air spring chambers 12 and 15 and, as they deflate, the sprung weight 8, outer valve housing 40, and cylinder means 41 are lowered from the upper position of FIG. 6 to the normal configuration datum position of FIG. 4 wherein lower piston portion 63 isolates lower position command orifice 30 from air spring chambers 12 and 15.

The operation of height control strut valve 40 includes the feature of being adapted to undergo slight oscillations without releasing air in a "dead band" zone established by the distance between seal 157 on upper piston portion 62 and upper position command orifice 48 and the distance between seal 157 on lower piston portion 63 and lower position command orifice 30.

As another aspect of the operation it should be pointed out that when piston means 60 is in the normal configuration datum position of FIG. 4, upper inner chamber 46 is constantly pressurized which tends to bias piston means 60 and cylinder means 41 apart whereby the strut valve mechanism, including its pivotal mountings at the mounting pins 92 and 92-A, are at all times maintained rigid thereby preventing rattling and wear.

Reference is next made to the modified height control system of FIG. 2 wherein height control strut valve 40 is mounted to the unsprung weight of the vehicle in a different manner. Here the lower pivotal mounting pin is pivotally connected to a lever 124 which is rigidly connected to the center torsion bar 120. The left end of such torsion bar is connected to the left side of the unsprung weight at a mounting bracket 122 and rod 121, and the right end of torsion bar 120 is connected to the right side of the unsprung weight 20 at a bracket 122 and mounting rod 121.

Torsion bar 120 is extended freely through holes 190 in bearing blocks 123 mounted on sprung weight 8. With this torsion bar arrangement it will be understood that when the vehicle is negotiating a curve the outward leaning of the vehicle, away from the direction in which the vehicle is turning, or in other words the roll of the vehicle with respect to its longitudinal axis, will twist one end of torsion bar 120 in one direction and the other end of the torsion bar will twist in the other direction. The center of the torsion bar, however, where lever 124 is rigidly mounted, will not twist with the results that height control strut valve 140 is not actuated by centrifugally imposed forces and is thereby made insensitive to the direction in which the vehicle is turning.

In the embodiment shown in FIG. 1 this height-control strut valve 40 is mounted adjacent one side of the vehicle adjacent the unsprung weight 10. It will be understood that with this embodiment the piston means 60 of the strut valve will be extended when the vehicle is cornering to the left. When this occurs strut valve 40 will deliver or release some of the pressurized air from the air chambers 12 and 15 such that the vehicle will have to make a readjustment to bring the suspension back to the normal configuration datum line 100 after the vehicle has completed negotiation of the curve. This centrifugally imposed actuation is generally negligible but can be completely eliminated by the torsion bar arrangement of FIG. 2.

Reference is next made to FIGS. 11 and 12 which illustrate another modified strut valve 40-B constructed in accordance with the present invention. The components of valve 40-B are identical to those of the modification of FIGS. 4-10 except that modification 40-B is provided with self-aligning ball joint mountings that also form fluid passages. The upper pivotal mounting is provided by a fitting 210 and the lower pivotal mounting is provided by a fitting 200. Each of these fittings includes a recess that pivotally receives a ball 202 formed on the end of a male fitting 203. The balls 202 are retained in their recesses by crimping the fittings 200 and 210 so as to partially close the entrances to the recesses. These ball joints are provided with a lubricant that is retained by the rubber sleeves 201.

As a further modification the valve 40-B includes a modified piston seal, FIG. 12, that consists of an outer ring 220 formed of Teflon or other low friction, self-lubricating material. Outer ring 220 is constantly pressure biased radially outwardly by an inner O-ring 221 formed of resilient material such as synthetic rubber or the like. This composite seal construction 220-221, in a combination with the previously described cylinder means 41 formed of Delrin or the like, provide low friction and extremely wear resistant mechanisms adapted to undergo millions of oscillations without leakage.

In accordance with the present invention it has been determined that a predetermined maximum static pressure $P_{MAX}$ in the air spring chambers 12 and 15 during cruise and idle operating conditions can be obtained by establishing a relationship between the area $A_1$ of driving compressor piston means 52 and the area $A_2$ of driven compressor 57 in accordance with the following "Direct Regulation Equation:"

$$P_{MAX} = \frac{A_1}{A_2}(P_{AA} - P_{MA})$$

where:

$P_{MAX}$ = The predetermined maximum static pressure in the air chamber means
$A_1$ = Area of the driving piston means of the compressor
$A_2$ = Area of the driven piston means of the compressor
$P_{AA}$ = Average atmospheric pressure
$P_{MA}$ = Average pressure in the engine intake manifold at normal cruising and idling speeds The above equation is developed by equating the predetermined maximum pressure $P_{MAX}$ in the air spring means to the stalling pressure $P_s$ of the compressor 25 such that (1) $\qquad P_{MAX} = P_S$ Now in order to satisfy equilibrium conditions in the compressor the following must be true:

(2) $\qquad P_S \times A_2 = A_1(P_A - P_M)$ where:

$P_S$ = The stalling pressure of the compressor
$P_A$ = The existing atmospheric pressure
$P_M$ = The existing pressure in the engine intake manifold Transposing $A_2$ (3) $\qquad P_S = \frac{A_1}{A_2}(P_A - P_M)$ Substituting Equation 3 in Equation 1

(4) $\qquad P_{MAX} = \frac{A_1}{A_2}(P_A - P_M)$

Then $P_{MAX}$ during cruising and idling conditions can be determined by substituting in Equation 4 the average atmospheric pressure $P_{AA}$ and average intake manifold pressure $P_{MA}$ for the existing pressure values $P_A$ and $P_M$ as follows:

(5) $\qquad P_{MAX} = \frac{A^1}{A_2}(P_{AA} - P_{MA})$

It should be mentioned that $P_{MAX}$ during cruising and idling conditions represents the maximum static pressure produced in the air spring chambers during approximately ninety-seven percent or more of the vehicle operation. Under very unusual operating circumstances, for example where maximum engine deceleration is applied for an extended period of time, the actual static pressure in the air spring chambers will temporarily reach pressure values above the $P_{MAX}$ defined by the above equation for the reason that the engine manifold will drop to an unusual low value that is less than the average. For example, pressures above $P_{MAX}$ can occur if the vehicle is descending on a long steep mountain road with maximum deceleration for an extended time interval. After the vehicle has negotiated the hill, however, and normal cruise and idle conditions are resumed, the system will automatically resume operating pressures not in excess of the predetermined $P_{MAX}$ defined by the above Equation 5.

The manifold pressure in the typical motor vehicle varies between the extremes of zero and approximately twenty-six inches of mercury, from full acceleration to full deceleration. However, at cruise and idle which represents about ninety-seven percent of the typical operation, the intake manifold pressure averages approximately twenty inches of mercury or approximately two-thirds of an atmosphere. This produces a positive pressure within the manifold of approximately one-third of an atmosphere or approximately five pounds per square inch absolute (p.s.i.a). Since the average atmospheric pressure for sea level operation is 14.7 p.s.i.a. the effective working pressure differential available for pressurizing compressor diaphragm 52 is the difference between these pressure values of approximately 10 p.s.i.a For a typical system, then, Equation 4 above can be simplified as follows:

(6) $\qquad P_{MAX} = 10\frac{A_1}{A_2}$

For a passenger vehicle a typical maximum predetermined static pressure $P_{MAX}$ in the air spring chambers 12 and 15 would be 25 p.s.i.a so substituting this in Equation 6 the required relationship between the areas of the driven and driving pistons of the compressor would be (7) $\qquad \frac{A_1}{A_2} = \frac{25}{10} = \frac{2.5}{1}$ In any static leveling system an acceptable maximum time for making a leveling correction under a maximum increase in static loading is, for example, ninety seconds. If a high pressure reservoir is to be eliminated, as in the system of the present invention, it is necessary that the compressor delivery rate be sufficient to in 90 seconds supply the air volume requirements to build up the pressure in air spring chambers 12 and 15 to the predetermined maximum static pressure $P_{MAX}$ which is 25 p.s.i.a. in the present typical system. Tests have shown that a diameter of 2.25 inches for the driven piston means 57 of the compressor will provide an adequate compressor delivery rate for small atmospherically driven compressors of the present type when actuated by the above mentioned typical manifold pressure of twenty inches of mercury.

If the diameter of driven piston means 57 is established at 2.25 inches then the area $A_2$ will be approximately 3.99 square inches so the area $A_1$ of driving piston means 52 is determined as follows from Equation 7:

$$A_1 = A_2 \times 2.5$$
$$= 3.99 \times 2.5$$
$$= 9.98 \text{ sq. inches}$$

In summary it will now be understood that if the area $A_1$ of the driving piston means 52 is established at approximately 9.98 square inches the compressor will be directly controlled to stall at the predetermined maximum static pressure of 25 p.s.i.a. selected for the typical example discussed above.

It will be understood, in view of the above calculations that the values set forth are by way of example for a controlled shock absorber system where the predetermined maximum pressure in the air spring chambers is 25 p.s.i.a. and the manifold pressure in the vehicle engine is approximately twenty inches of mercury at average engine speeds. Obviously the system can be applied to various system loads and pressures without departing from the spirit of the present invention.

While the form of embodiment of the present invention as herein disclosed constitute a preferred form, it is to be understood that other forms might be adopted, all coming within the scope of the claims which follow:

We claim:

1. A control system for vehicle suspensions of the type that include sprung and unsprung weight portions comprising, in combination, air chamber means operative between said sprung and unsprung weights; an air compressor including a compressor outlet for delivering a flow of pressurized air to said air chamber means; driving means for said compressor, said compressor being controlled whereby the pressure developed in said air chamber means does not exceed a predetermined maximum static pressure selected for said air chamber means; and flow control valve means between said compressor outlet and said air chamber means for controlling said flow of pressurized air, said valve means including an inlet passage, an outlet passage, and time delay exhaust restrictor means for said outlet passage, the flow rate through said restrictor means being proportional to the flow rate through said inlet passage during road imposed oscillations of said valve means.

2. The control system defined in claim 1 wherein said control valve means includes a movable flow control element that terminates said flow of pressurized air from said compressor outlet to said air chamber means and thereby stalls said compressor responsive to a predetermined height differential between said sprung and unsprung weights.

3. The control system for vehicle suspensions defined in claim 1 wherein said valve means includes a cylinder means provided with a height control orifice means and an annular groove communicating with said orifice means; and two contiguous O-rings in said annular groove that are separable responsive to pressurization of said orifice means beyond a predetermined minimum pressure value.

4. A control system for vehicle suspensions of the type that include sprung and unsprung weight portions comprising, in combination, air chamber means operative between said sprung and unsprung weights and engine for powering said vehicle and including an intake manifold; an air compressor including a driven piston means, a driving piston means communicating with the pressure in said intake manifold and with atmospheric pressure and a compressor outlet for delivering a flow of pressurized air to said air chamber means; resilient driving means for said compressor, said compressor being stallable against said resilient driving means when the static pressure in said air chamber means reaches a predetermined maximum static pressure determined by the following equation:

$$P_{MAX} = \frac{A_1}{A_2}(P_A - P_M)$$

where:

$P_{MAX}$=The predetermined maximum static pressure in the air chamber means
$A_1$=Area of the driving piston means of the compressor
$A_2$=Area of the driven piston means of the compressor
$P_A$=Atmospheric pressure
$P_M$=Pressure in the engine intake manifold and a flow control valve means for said air chamber means.

5. The control system defined in claim 4 wherein said control valve means includes a movable flow control element that terminates said flow of pressurized air from said compressor outlet to said air chamber means and thereby stalls said compressor responsive to a predetermined height differential between said sprung and unsprung weights.

6. A control system for vehicle suspensions of the type that include sprung and unsprung weight portions comprising, in combination, air chamber means operative between said sprung and unsprung weights; an air compressor including a driving piston means, a driven piston means, and a compressor outlet for delivering a flow of pressurized air to said air chamber means; resilient driving means for said compressor, said compressor being stallable against said resilient driving means whereby the pressure developed in said air chamber means does not exceed a predetermined maximum static pressure selected for said air chamber means; and valve means including a valve housing mounted on one of said sprung and unsprung weights, a valve inlet passage communicating with said air compressor, a valve outlet passage for releasing air from said system, and a third valve passage communicating with said chamber; a movable valve element in said valve housing and movable between an "open" position for starting said air compressor and a "closed" position for stalling said air compressor; valve actuating means connecting said movable valve element to the other of said sprung and unsprung weights, said valve means including a time delay exhaust restrictor means for said outlet passage, the flow rate through said exhaust restrictor means being proportional to the flow rate through said inlet passage during road imposed oscillations of said valve means.

7. A control system for vehicle suspensions of the type that include sprung and unsprung weight portions comprising, in combination, air chamber means operative between said sprung and unsprung weights an engine for powering said vehicle and including an intake manifold; an air compressor including a driving piston means, a driven piston means communicating with the pressure in said intake manifold and with atmospheric pressure and a compressor outlet for delivering a flow of pressurized air to said air chamber means; resilient driving means for said compressor, said compressor being stallable against said resilient driving means when the static pressure in said air chamber means reaches a predetermined maximum static pressure determined by the following equation:

$$P_{MAX} = \frac{A_1}{A_2}(P_A - P_M)$$

where:

$P_{MAX}$=The predetermined maximum static pressure in the air chamber means
$A_1$=Area of the driving piston means of the compressor
$A_2$=Area of the driven piston means of the compressor
$P_A$=Atmospheric pressure
$P_M$=Pressure in the engine intake manifold and valve means including a valve housing mounted on one of said sprung and unsprung weights, a valve inlet passage communicating with said air compressor, a valve outlet passage for releasing air from said system, and a third valve passage communicating with said chamber; a movable valve element in said valve housing and movable between an "open" position for starting said air compressor and a "closed" position for stalling said air compressor; and valve actuating means connecting said movable valve element to the other of said sprung and unsprung weights.

8. A control system for vehicle suspensions of the type that includes an air chamber for supporting a portion of the weight of the vehicle, said system comprising air compressor means; and control means operative between said sprung and unsprung weights and including a cylinder means communicating with said compressor and having a cylinder side wall provided with a control orifice means for releasing air from said cylinder means, piston means in said cylinder means and co-operating with said control orifice means for sensing suspension configuration; said control orifice means includes two control orifices located at spaced locations along said cylinder side wall, said two orifices establishing a dead band zone in said control means; and wherein said piston means includes a piston rod provided with a longitudinal rod passage, spaced pistons mounted on said piston rod, and a second rod passage through the wall of said piston rod intermediate said spaced pistons.

9. The control system for vehicle suspensions defind in claim 8 wherein the spacing between said pistons is less than the spacing between said control orifices to establish said dead band zone.

10. A control system for vehicle suspensions of the type that includes an air chamber for supporting a portion of the weight of the vehicle, said system comprising air compressor means; and control means operative between said sprung and unsprung weights and including a cylinder means communicating with said compressor and having a cylinder side wall provided with a control orifice means for releasing air from said cylinder means, piston means in said cylinder means and co-operating with said control orifice means for sensing suspension configuration; said cylinder means including an annular groove communicating with said control orifice means and including an inclined groove surface; and two O-rings in said groove and biased toward contiguous relationship by said groove surface, said O-rings being separable responsive to pressurization of said cylinder beyond a predetermined minimum pressure value.

11. A control system for vehicle suspensions of the type that includes an air chamber for supporting a portion of the weight of the vehicle, said system comprising air compressor means; and control means operative between said sprung and unsprung weights and including a cylinder means communicating with said compressor and having a cylinder side wall provided with a control orifice means for releasing air from said cylinder means, piston means in said cylinder means and co-operating with said control orifice means; said cylinder means including an annular groove communicating with said control orifice means and including an inclined groove surface; two O-rings in said groove and biased toward contiguous relationship by said groove surface, said O-rings being separable responsive to pressurization of said cylinder means beyond a predetermined minimum pressure value; and an O-ring adjusting means mounted for adjustable movement on said cylinder means for varying the bias of said contiguous relationship of said O-rings.

12. A control system for vehicle suspensions of the type that includes an air chamber for supporting a portion of the weight of the vehicle, said system comprising air compressor means; and control means operative between said sprung and unsprung weights and including a cylinder means communicating with said compressor and having a cylinder side wall provided with a control orifice means for releasing air from said cylinder means, piston means in said cylinder means and co-operating with said control orifice means for sensing suspension configuration; said cylinder means including an annular groove communicating with said control orifice means and including an inclined groove surface; two O-rings in said groove and biased toward contiguous relationship by said groove surface, said O-rings being separable responsive to pressurization of said cylinder beyond a predetermined minimum pressure value; and an annular O-ring adjusting member mounted for longitudinal movement on said cylinder means and forming said inclined groove surface.

13. A control system for vehicle suspensions of the type that includes an air chamber for supporting a portion of the weight of the vehicle, said system comprising air compressor means; and control means operative between said sprung and unsprung weights and including a cylinder means communicating with said compressor and having a cylinder side wall provided with a control orifice means for releasing air from said cylinder means, piston means in said cylinder means and co-operating with said control orifice means for sensing suspension configuration; said control orifice means including a main control passage on one side of said piston means for smaller volumetric flows of fluid, an auxiliary control passage on said one side of said piston means for larger volumetric flows of fluid and a second main control passage on the other side of said piston.

14. A control system for vehicle suspensions of the type that includes an air chamber for supporting a portion of the weight of the vehicle, said system comprising air compressor means; control means operative between said weights and including an outer housing means; a tubular cylinder means of self-lubricating material mounted in said outer housing means and spaced therefrom to form a chamber, said cylinder means including a cylinder wall provided with a control orifice means communicating with said chamber; and piston means mounted for reciprocation in said tubular cylinder means and co-operating with said control orifice means to form a self-lubricating position command valve; said cylinder means including an annular groove communicating with said control orifice means; and two contiguous O-rings in said annular groove that are separable responsive to pressurization of said cylinder beyond a predetermined minimum pressure value.

15. A control system for vehicle suspensions of the type that includes an air chamber for supporting a portion of the weight of the vehicle, said system comprising air compressor means; control means operative between said weights and including an outer housing means; a tubular cylinder means of self-lubricating material mounted in said outer housing means and spaced therefrom to form a chamber, said cylinder means including a cylinder wall provided with a control orifice means communicating with said chamber; piston means mounted for reciprocation in said tubular cylinder means and co-operating with said control orifice means to form a self-lubricating position command valve, said control orifice means including two control orifices located at spaced locations along said cylinder side wall, said piston means including a piston rod provided with a longitudinal piston rod passage, spaced pistons mounted on said piston rod, and a second piston rod passage through the wall of said piston rod and communicating with said cylinder means between said spaced pistons; and minimum pressure valve means for establishing a predetermined minimum pressure in said system.

16. The control system for vehicle suspensions defined in claim 15 wherein said minimum pressure valve means is formed by a groove in said cylinder means and two contiguous O-rings in said groove.

17. The control system for vehicle suspensions defined in claim 15 wherein said minimum valve means is formed by a groove in said cylinder means and two contiguous O-rings in said groove; and adjustable means biasing said O-rings toward contiguous relationship.

18. The control system for vehicle suspensions defined in claim 17 wherein said piston means includes an annular groove; an outer seal disposed in said groove and formed of low friction material; and an inner seal disposed in said groove and formed of resilient material, said outer seal being biased outwardly against said cylinder wall by said inner resilient seal to provide self-lubricating, low friction operation between said piston and cylinder.

19. A control system for vehicle suspensions of the type that includes an air chamber for supporting a portion of the weight of the vehicle, said system comprising an air compressor including a compressor outlet; control means operative between the sprung and unsprung weights of the vehicle for controlling the flow of air in said system, said control means including a first port communicating with said compressor outlet, a second port communicating with said air chamber, a third port for exhausting air from said air chamber, cylinder means connected to one of said weights and including a cylinder wall provided with a control orifice means, and piston means in said cylinder means and operatively connected to the other of said weights; said cylinder means including an annular groove communicating with said control orifice means; and two contiguous O-rings in said annular groove that are separable responsive to pressurization of said cylinder means beyond a predetermined minimum pressure value.

20. The control system for vehicle suspensions defined in claim 19 wherein said piston means includes an annular groove; an outer seal disposed in said groove and formed of low friction material; and an inner seal disposed in said groove and formed of resilient material, said outer seal being biased outwardly against said cylinder wall by said inner resilient seal to provide self-lubricating, low friction operation between said piston and cylinder.

21. A control system for vehicle suspensions of the type that includes an air chamber for supporting a portion of the weight of the vehicle, said system comprising an air compressor including a compressor outlet; control means operative between the sprung and unsprung weights of the vehicle for controlling the flow of air in said system, said control means including a first port communicating with said compressor outlet, a second port communicating with said air chamber, a third port for exhausing air from said air chamber, cylinder means connected to one of said weights and including a cylinder wall provided with a control orifice means, and piston means in said cylinder means and operatively connected to the other of said weights, said control orifice means including two control orifices located at spaced locations along said cylinder side wall, said piston means including a piston rod provided with a longitudinal piston rod passage, spaced pistons mounted on said piston rod, and a second piston rod passage through the wall of said piston rod and communicating with said cylinder means between said spaced pistons; and minimum pressure valve means for establishing a predetermined minimum pressure in said system.

22. A control system for vehicle suspensions of the type that includes an air chamber for supporting a portion of the weight of the vehicle, said system comprising an air compressor actuated by atmospheric pressure and including a larger driving piston exposed to atmospheric pressure and a smaller driven piston connected to said driving piston for charging a compressor outlet; control means operative between the sprung and unsprung weights of the vehicle for controlling the flow of air in said system, said control means including a first port communicating with said compressor outlet, a second port communicating with said air chamber, a third port for exhausting air from said air chamber, cylinder means connected to one of said weights and including a cylinder wall provided with a control orifice means, and piston means in said cylinder means and operatively connected to the other of said weights.

23. The control system for vehicle suspensions defined in claim 22 wherein said piston means includes an annular groove; an outer seal disposed in said groove and formed of low friction material; and an inner seal disposed in said groove and formed of resilient material, said outer seal being biased outwardly against said cylinder wall by said inner resilient seal to provide self-lubricating, low friction operation between said piston and cylinder.

24. The control system for vehicle suspensions defined in claim 22 wherein said cylinder means includes an annular groove communicating with said control orifice means; and two contiguous O-rings in said annular groove that are separable responsive to pressurization of said cylinder means beyond a predetermined minimum pressure value.

25. A control system for vehicle suspensions of the type that includes an air chamber for supporting a portion of the weight of the vehicle, said system comprising an air compressor including a larger driving piston and a smaller driven piston connected to said driving piston for charging a compressor outlet; control means operative between the sprung and unsprung weights of the vehicle for controlling the flow of air in said system, said control means including a first port communicating with said compressor outlet, a second port communicating with said air chamber, a third port for exhausting air from said air chamber, cylinder means connected to one of said weights and including a cylinder wall provided with a control orifice means, and piston means in said cylinder means and operatively connected to the other of said weights, said control orifice means including two control orifices located at spaced locations along said cylinder side wall, said piston means including a piston rod provided with a longitudinal piston rod passage, spaced pistons mounted on said piston rod, and a second piston rod passage through the wall of said piston rod and communicating with said cylinder means between said spaced pistons; and minimum pressure valve means for establishing a predetermined minimum pressure in said system.

26. A control system for vehicle suspensions of the type that includes sprung and unsprung weight portions comprising, in combination, air chamber means operative between said sprung and unsprung weights; an air compressor including a compressor outlet for delivering a flow of pressurized air to said air chamber means; driving means for said compressor; valve means for controlling the flow of air through said air chamber means, said valve including an outer housing means; a tubular cylinder means of self-lubricating material in said outer housing means and spaced therefrom to form a chamber, said cylinder means including a cylinder wall provided with a control orifice means communicating with said chamber; piston means mounted for reciprocation in said cylinder means and cooperating with said control orifice means to form a self-lubricating position command valve, said control orifice means including two control orifices located at spaced locations along said cylinder side wall, said piston means including a piston rod provided with a longitudinal piston rod passage, spaced pistons mounted on said piston rod, and a second piston rod passage through the wall of said piston rod and communicating with said cylinder means between said spaced pistons; and minimum pressure valve means for establishing a predetermined minimum pressure in said system.

27. A control system for vehicle suspensions of the type that includes sprung and unsprung weight portions comprising, in combination, air chamber means operative between said sprung and unsprung weights; an air compressor including a compressor outlet for delivering a flow of pressurized air to said air chamber means; driving means for said compressor; valve means for controlling the flow of air through said air chamber means, said valve including an outer housing means; a tubular cylinder means in said outer housing means and spaced therefrom to form a chamber, said cylinder means including a cylinder wall provided with a control orifice means communicating with said chamber; piston means mounted for reciprocation in said cylinder means and co-operating with said control orifice means to form a position command valve, said control orifice means including two control orifices located at spaced locations along said cylinder side wall, said piston means including a piston rod provided with a longitudinal piston rod passage, spaced pistons mounted on said piston rod, and a second piston rod passage through the wall of said piston rod and communicating with said cylinder means between said spaced pistons; and minimum pressure valve means on said outer housing means for establishing a predetermined minimum pressure in said valve.

28. A control system for vehicle suspensions of the type that includes sprung and unsprung weights and an air chamber forming spring means between said weights, said system comprising air compressor means including larger air cylinder provided with first and second ports; larger piston means in said larger air cylinder intermediate said first and second ports; a smaller air cylinder including a compressor inlet port and a compressor inlet port and a compressor outlet port; smaller piston means in said smaller air cylinder; driving means connecting said larger and smaller piston means; compressor valve means actuated by said piston means and including a first valve port for connection with the intake manifold of the vehicle, a second valve port communicating with said first port of said larger air cylinder, and a third valve port communicating with said second port of said large air cylinder; valve means operative between said weights and including a height responsive "on-off" valve communicating with said compressor means, the operation of said valve serving to start and stop said compressor; and time delay exhaust restrictor means for said valve means, the flow rate through said restrictor means being proportional to the compressor means delivery rate admitted by said valve means during road imposed oscillations of said valve means.

29. A control system for vehicle suspensions of the type that includes sprung and unsprung weights and an air chamber forming spring means between said weights, said system comprising air compressor means including a larger air cylinder provided with first and second ports; larger piston means in said larger air cylinder intermediate said first and second ports; a smaller air cylinder including a compressor inlet port and a compressor outlet port; smaller piston means in said smaller air cylinder; driving means connecting said larger and smaller piston means; compressor valve means actuated by said piston means and including a first valve port for connection with the intake manifold of the vehicle, a second valve port communicating with said first port of said larger air cylinder, and a third valve port communicating with said second port of said larger air cylinder; and a cylinder means communicating with said compressor and having a side wall provided with a control orifice means, piston means in said cylinder means and co-operating with said control orifice means to perform the dual function of sensing suspension configuration and regulating said air compressor, wherein said piston means includes an annular groove; an outer seal disposed in said groove and formed of low friction material; and an inner seal disposed in said groove and formed of resilient material, said outer seal being biased outwardly against said cylinder wall by said inner resilient seal to provide self-lubricating, low friction operation between said piston and cylinder.

30. A control system for vehicle suspensions of the type that includes sprung and unsprung weights and an air chamber forming spring means between said weights, said system comprising air compressor means including a larger air cylinder provided with first and second ports; larger piston means in said larger air cylinder intermediate said first and second ports; a smaller air cylinder including a compressor inlet port and a compressor outlet port; smaller piston means in said smaller air cylinder; driving means connecting said larger and smaller piston means; compressor valve means actuated by said piston means and including a first valve port for connection with the intake manifold of the vehicle, a second valve port for connection with the intake manifold of the larger air cylinder, and a third valve port communicating with said second port of said larger air cylinder; a cylinder means communicating with said compressor and having a side wall provided with a control orifice means, piston means in said cylinder means and co-operating with said control orifice means to perform the dual function of sensing suspension configuration and regulating said air compressor, said control orifice means including two control orifices located at spaced locations along said cylinder side wall, said piston means including a piston rod provided with a longitudinal piston rod passage, spaced pistons mounted on said piston rod, and a second piston rod passage through the wall of said piston rod, and communicating with said cylinder means between said spaced pistons; and minimum pressure valve means for establishing a predetermined minimum pressure in said system.

31. The control system for vehicle suspension defined in claim 30 wherein said minimum pressure valve means is formed by a groove in said cylinder means and two contiguous O-rings in said groove.

32. The control system for vehicle suspensions defined in claim 30 wherein said piston means includes an annular groove; an outer seal disposed in said groove and formed of low friction material; and an inner seal disposed in said groove and formed of resilient material, said outer seal being biased outwardly against said cylinder wall by said inner resilient seal to provide self-lubricating, low friction operation between said piston and cylinder.

33. A control system for vehicles of the type that includes sprung and unsprung weights and an air chamber forming spring means between said weights, said system comprising air compressor means; a torsion bar extending laterally of said vehicle and including right and left connections with respective right and left sides of one of said weights; control means operative between said torsion bar between said connections and the other of said weights and including a height responsive "on-off" valve communicating with said compressor means, the operation of said valve serving to start and stop said compressor, said control means including a cylinder wall provided with a control orifice means and a piston means mounted for reciprocation in said cylinder means and co-operating therewith to form a position command valve.

34. In a vehicle suspension system of the type that includes sprung and unsprung weights and air chambers forming resilient means between said weights, the combination of a track bar extending laterally of said vehicle for preventing relative lateral movement of said weights and including an inner track bar end connected to said sprung weight; and height control valve means including an upper connection with said sprung weight and a lower connection with said track bar, wherein the distance between said track bar and said sprung weight varies at different locations along said track bar and wherein the position of said lower connection is laterally adjustable along said track bar whereby the travel of said valve means can be adjusted to the amplitude of oscillation of said suspension system.

35. The suspension system defined in claim 34 wherein said valve means includes a piston rod provided with a longitudinal passage, and wherein said lower connection includes a line fitting connector communicating with said longitudinal passage.

References Cited

UNITED STATES PATENTS

| | | | |
|---|---|---|---|
| 3,215,339 | 11/1965 | Jackson | 230—52 |
| 3,038,739 | 6/1962 | Vogel | 280 |
| 3,003,784 | 10/1961 | Hodkin | 280 |
| 3,002,765 | 10/1961 | MacDuff | 280 |
| 2,888,270 | 5/1959 | Wolfram | 280 |

PHILLIP GOODMAN, Primary Examiner

U.S. Cl. X.R.

280—6; 267—65